Dec. 12, 1950     J. P. KOVACS ET AL     2,533,266
FILTER
Filed March 13, 1946     3 Sheets-Sheet 1
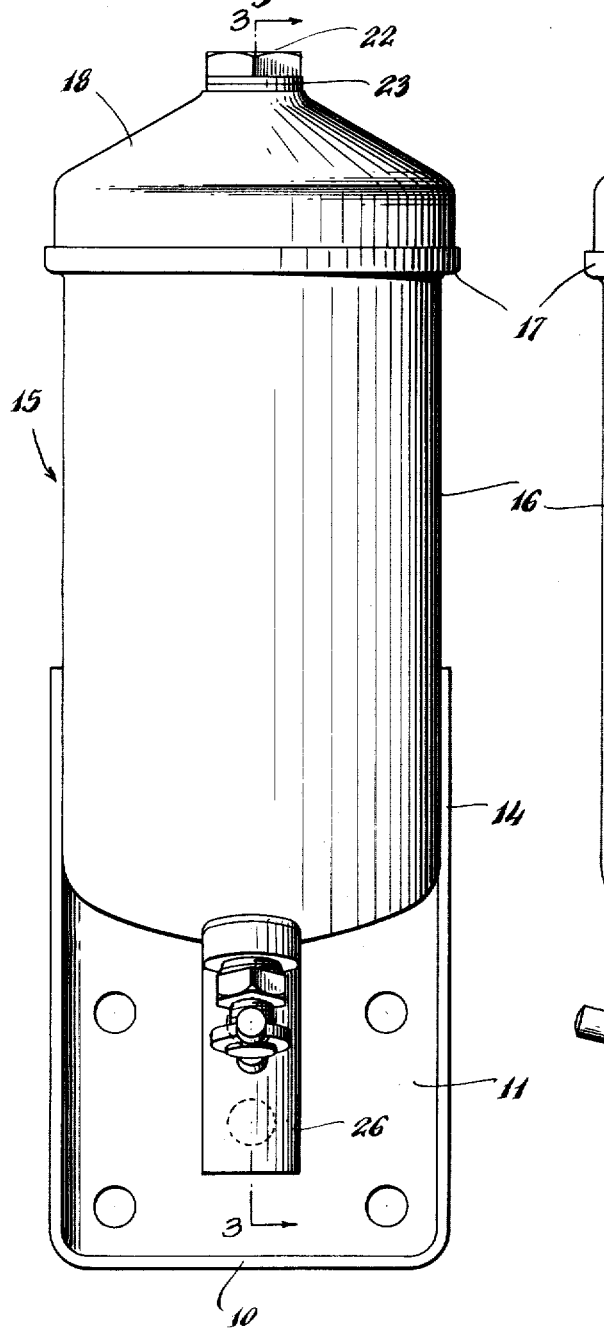
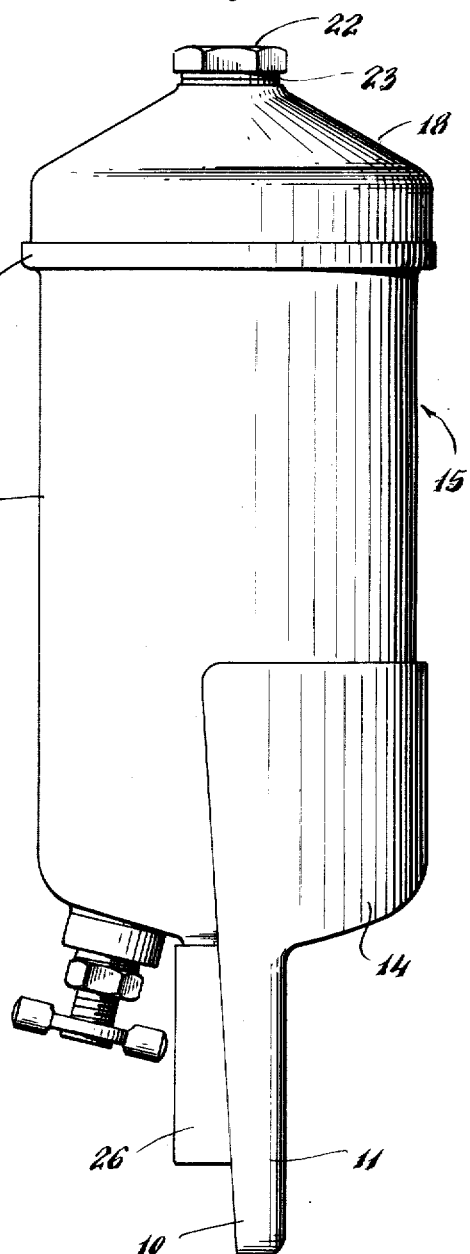
INVENTORS.
Julius P. Kovacs
William H. Hultgren
BY Kenyon & Kenyon
ATTORNEYS.

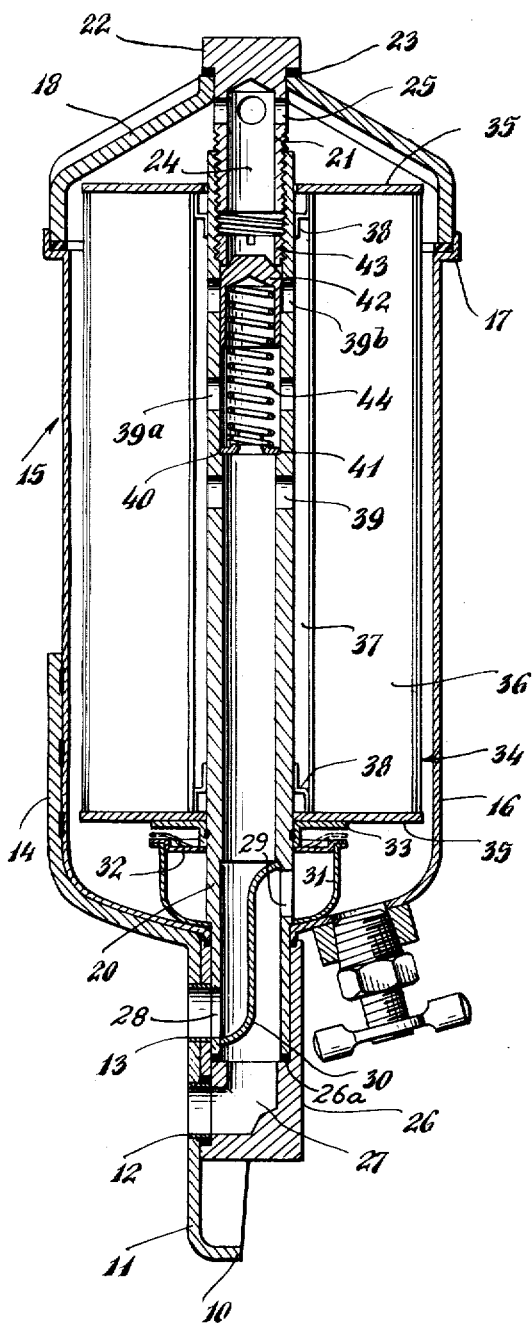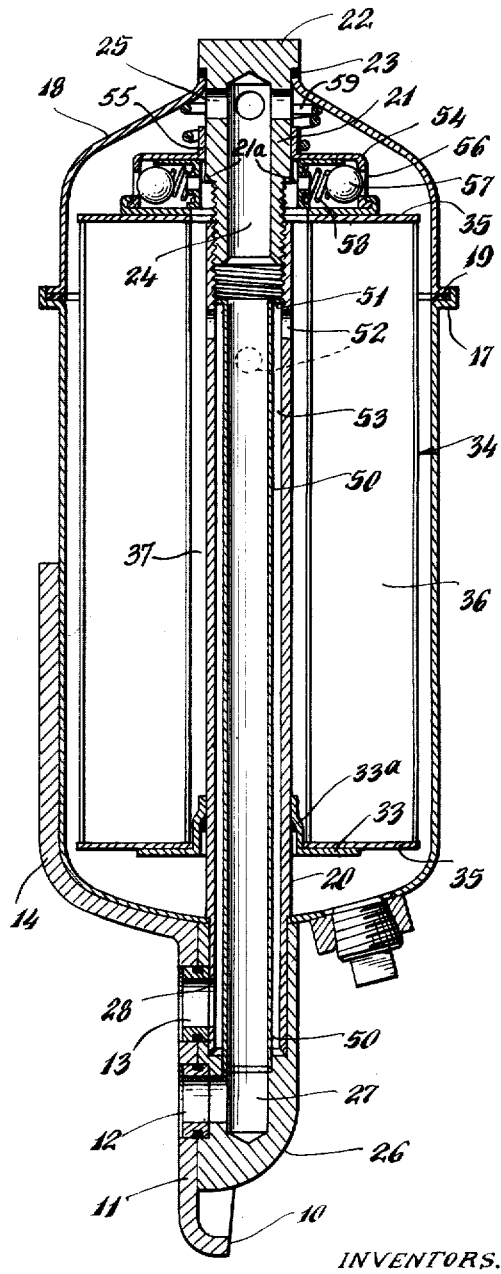

Dec. 12, 1950

J. P. KOVACS ET AL 2,533,266

FILTER

Filed March 13, 1946

INVENTORS.
Julius P. Kovacs
William H. Hultgren
BY
Kenyon & Kenyon
ATTORNEYS.

Patented Dec. 12, 1950

2,533,266

UNITED STATES PATENT OFFICE 2,533,266

FILTER

Julius P. Kovacs, Newark, and William H. Hultgren, Roselle Park, N. J., assignors to PurOlator Products, Inc., Newark, N. J., a corporation of Delaware Application March 13, 1946, Serial No. 654,342

18 Claims. (Cl. 210—183)

This invention relates to filters and more especially to filters for use in connection with the lubricating system of an automotive internal combustion engine.

An object of this invention is an improved filter structure as well as improved means for connecting the filter to the lubrication system of an internal combustion engine.

Other objects, novel features and advantages of this invention will become apparent from the following specification and accompanying drawings, wherein:

Fig. 1 is a front elevation of a filter embodying the invention;

Fig. 2 is an elevation at right angles to Fig. 1;

Figs. 3, 4, 5 and 6 are sections on the line 3—3 of Fig. 1 illustrating different embodiments of the invention.

Figure 5:
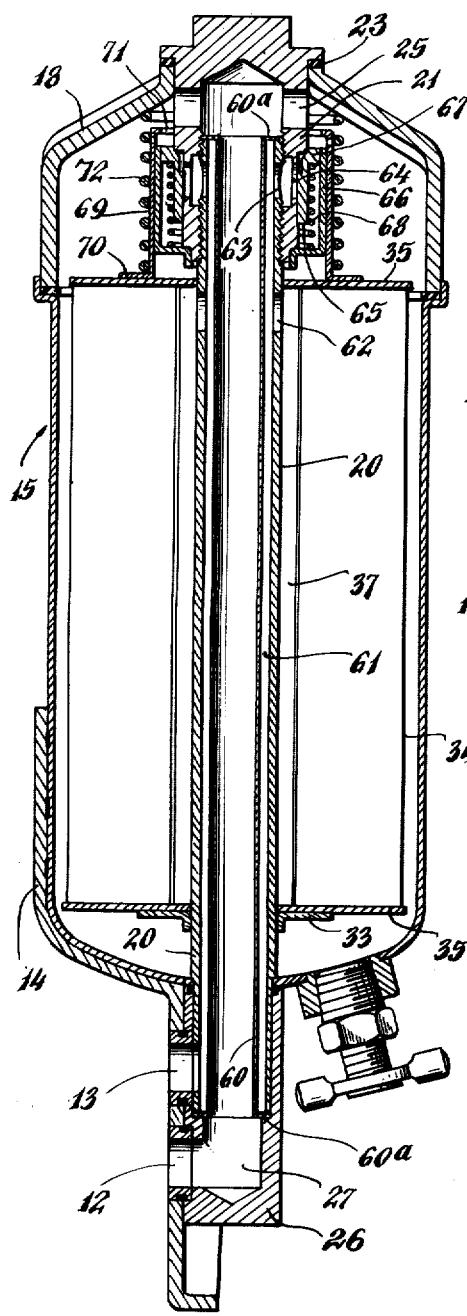

A stamped sheet metal bracket 10 has a flat section 11 in which are provided two ports 12 and 13 and also has a section 14 in the general form of a half cup. A cylindrical casing 15 has one end seated in said half cup section 14 to which the casing is permanently attached as by brazing.

The casing 15 consists of a cup-shaped drawn metal section 16 having its upper end slightly enlarged to form an annular shoulder 17 and a cap section 18, the rim of which is in alinement with the shoulder 17, a gasket 19 being interposed between said shoulder and said rim. A pipe 20 is located axially of the section 16 with its lower end extending through an aperture in the bottom of said section and there being a suitable liquid-tight seal between the pipe 20 and the section 16. The upper end of the pipe 20 is threaded to received the threaded end of a rod 21 extending through the cap 18 and having a hexagonal head 22 of greater cross-section than the cap aperture. A gasket 23 is interposed between the head 22 and the cap 18 while in the modifications of Figs. 3, 4 and 6, the rod 21 is provided with a bore 24 communicating with radial passageways 25 leading to the interior of the casing. The rod 21 serves to retain the cap 18 in assembled relation to the section 16.

In the embodiment of Fig. 3, a fitting 26 is mounted on the lower end of the pipe 20 exterior of the casing 15 and has an annular shoulder 26a engaged by the end of the pipe. A passageway 27 in the fitting 26 provides communication between the end of the pipe 20 and the port 12 in the bracket 10 and a passageway 28 provides communication between the interior of the pipe 20 and the port 13 in the bracket 10. The pipe 20 has a radial passageway 29 providing communication between the interior and exterior of the pipe within the end of which is provided a partition 30 of such design and arrangement that the passageway 29 communicates only with the passageway 27 and the passageway 28 is excluded from communication with the passageway 27. A sheet metal cup 31 is arranged within the section 16 in contact with the bottom thereof and has an aperture through which extends the pipe 20. The rim of the cup 31 is located on a higher elevation than the highest point of the passageway 29 and the cup is closed by an annular diaphragm 32 fixed to the pipe 20 with its outer periphery resting on the cup rim and being free to flex relative thereto.

A collar 33 is fixed to the pipe 20 above the cup 31 and supports a filtering unit 34 through which the pipe extends. The filtering unit 34 consists of two spaced axially apertured disks 35 between which is arranged a filtering medium annulus 36 having its central passageway communicating with the disk apertures. The disk apertures are of proper size to fit the pipe 20 while the central passageway preferably is of somewhat larger cross-section than the disk apertures, thereby forming an annular chamber 37 between the inner surface of the annulus 36 and the pipe 20 for receiving filtrate passing through the filtering medium annulus. Guide collars 38 are supported by the filtering unit 34 within its central passageway for engagement with the pipe 20 to centralize the unit 34 along the pipe 20. The details of the filtering unit are not illustrated as the particular structure of said unit forms no part of the present invention.

The pipe 20 is provided with three sets of radial passageways 39, 39a and 39b respectively and its bore is slightly enlarged to provide an interior annular shoulder 40 which supports an apertured disk 41. A piston valve 42 is slidably mounted in the pipe 20 beyond the disk 41 and its upward movement is limited by a bushing 43 threaded into the pipe 20. The piston valve 42 is of such design that when it engages the bushing 43 it seals the apertures 39b and a spring 44 is provided for biasing the valve piston into such position. Downward movement of the piston valve 42 against the action of the spring 44 unseals the apertures 39b.

The filter is assembled with the lubricating system of an internal combustion engine by bolting the bracket 10 to the engine block with the ports 12 and 13 in alinement with corresponding ports in the engine block and communicating with the engine lubricating system. Oil to be filtered flows through the passageways 27 and 29 into the cup 31 from which it escapes into the interior of the casing 15 by lifting the outer edge of the diaphragm 32 sufficiently for the purpose as illustrated by the broken line position of said diaphragm 32 in Fig. 3. Normally, the oil flows inwardly through the filtering medium 36 and the filtrate passes from the chamber 37 through the passageways 39 and 39a into the pipe 20 from which it is discharged through the port 13. In the event that the oil cannot pass through the filtering medium at the rate it is supplied to the casing 15, it by-passes the filtering medium through the passageways 26 and the bore 24 of the rod 21 into the upper end of the pipe 20 and moves the piston 42 against the action of the spring 44 into position to open the passageways 39b whereupon the liquid flows through said passageways to the exterior of the pipe and then returns to the interior of the pipe through the passageways 39 and 39a and thence flows through the remainder of the pipe to the port 13. The diaphragm 32 acts as a check valve to prevent drain back when flow through the filter is discontinued. Also, it prevents disturbance and agitation of any precipitated material lying in the bottom of the casing 15, thus permitting location of the inlet at the bottom of said casing.

In the embodiment of Fig. 4, a tube 50 is arranged within the pipe 20 with one end communicating with the passageway 27 in the fitting 26 and there being substantial clearance between the exterior surface of the tube 50 and the interior surface of the pipe 20. At its upper end, the tube 50 is provided with a flange 51 snugly fitting the interior of the pipe 20. The pipe 20 is provided with apertures 52 providing communication between the exterior of the pipe 20 and the annular space 53 between the tube 50 and the pipe 20. The apertures in the disks 35 are of greater size than the pipe 20 and the chamber 37 of the filtering unit 34 is of the same cross-section as the disk apertures. The collar 33 has a cylindrical central portion 33a snugly fitting the aperture in the bottom disk 35.

A cylindrical housing 54 rests on the upper disk 35 of the filtering unit 34 and has a bottom aperture in register with the upper disk 35 aperture and a top aperture through which passes the rod 21 and the upper end of the housing 54 is provided with a collar 55 snugly fitting said rod. Housing 54 is prevented from slipping off rod 21 when the latter is unscrewed from pipe 20 and lifted with cap 18 as by staking 21a at the shoulder defined between the externally threaded portion of rod 21 and its upper parts, or in other suitable ways. The curved wall of the housing 54 has several apertures 56 normally closed by ball valves 57 biased into sealing relation to the apertures by the springs 58. A helical spring 59 is interposed between the cap 18 and the top of the housing 54 to urge the latter against the upper disk 35 of the filter unit 34 and the bottom disk 35 of such unit against the collar 33.

In the normal operation of this embodiment, oil to be filtered flows through the inlet port 12, passageway 27, tube 50, rod bore 24 and rod passageway 25 into the top of the casing and around the filtering unit 34. Filtrate collecting in the chamber 37 of the filtering unit flows by way of the passageway 52 and annular space 53 to the outlet port 13. In the event that the oil cannot pass through the filtering unit at the rate it is supplied to the casing 15, it by-passes the same by way of the apertures 56 in the housing 54 and the annular passageway between the pipe 20 and the periphery of the aperture in the upper disk 35, the balls 57 being unseated by the oil pressure, into the chamber 37 of the filtering unit 34 and thence to the outlet 13 as previously described.

In the modification of Fig. 5, a tube 60 is arranged within the pipe 20 to form an annular space 61 between its outer surface and the inner surface of the pipe and has end flanges 60a engaging the ends of the pipe. The pipe 20 is exteriorly threaded at its upper end and is provided with a set of radial passageways 62 communicating with the chamber 37 of the filter unit 34 and another set of radial passageways 63 located near the end of the pipe. The filtering unit 34 is similar to the filtering unit of Fig. 3 in that the apertures in the disk 35 are of proper size snugly to fit the pipe 20 while the chamber 37 is of somewhat greater cross-section than the disk apertures. The rod 21 is interiorly threaded and in addition to the radial passageways 25 is provided with additional radial passageways 64 in register with the passageways 63 in the pipe 20. A sleeve valve 65 is slidably mounted on the rod 21 in sealing relation to the passageways 64. The cup 66 is supported by the rod 21 and surrounds the sleeve valve 65 with clearance therebetween except that the sleeve has a flange 67 snugly engaging the inner face of the cup. A spring 68 is arranged within the cup 66 and engages the flange 67 to bias the sleeve valve 65 into position to seal the passageways 64. An inverted cup-shaped member 69 has a flanged rim 70 engaging the upper disk 35 and an aperture 71 through which the rod 21 extends with clearance between the aperture rim and the rod surface. A spring 72 interposed between the cap 18 and the flange 70 urges the latter into contact with the top disk 35 and the bottom disk 35 into contact with the collar 33.

In the normal operation of this embodiment, oil to be filtered flows through the inlet 12, passageway 27, tube 60 and rod passageways 25 into the top of the casing and around the filtering unit. Filtrate collecting in the chamber 37 of the filtering unit flows by way of the passageway 62 and annular space 61 to the outlet 13. In the event that oil cannot pass through the filtering unit at the rate it is supplied to the casing 15, it by-passes the filter unit by way of the passageway formed between the periphery of the aperture 71 and the outer surface of the rod 21 and the passageways 64 and 63 into the annular space 61, flow through the passageways 64 being permitted by movement of the sleeve valve 65 against the action of the spring 68 into position to unseal said passageways.

Figure 6:
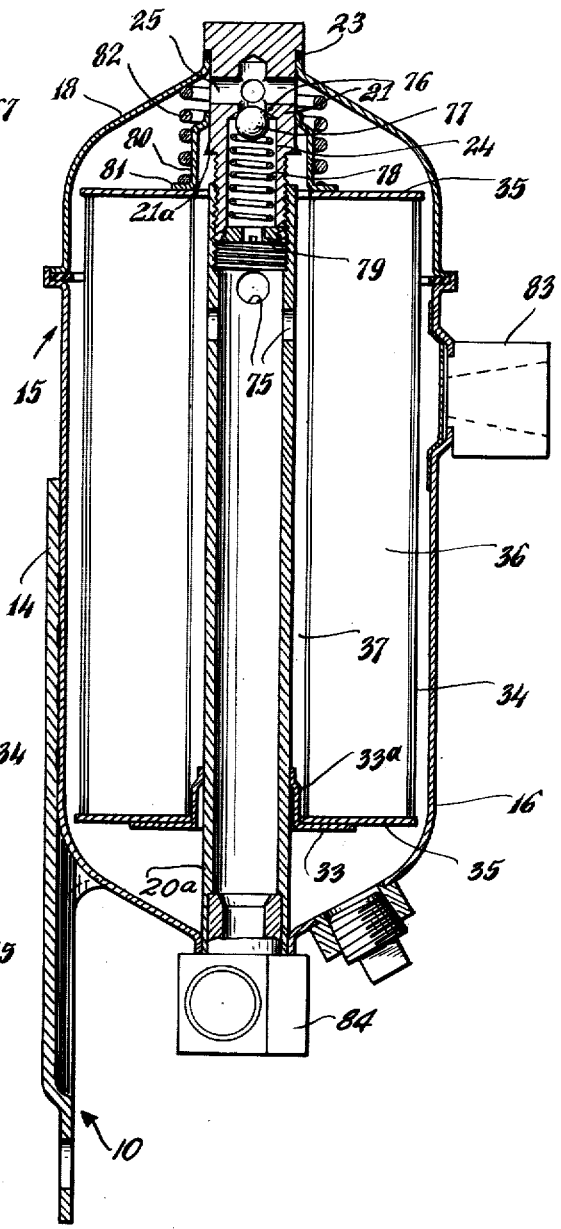

In the embodiment of Fig. 6, the ports 12 and 13 are omitted from the bracket 10 but this bracket is provided with the half cup-shaped section 14 in which the casing 15 is seated. A pipe 20a extends through the bottom of the casing section 16 and is interiorly threaded at its upper end. The pipe 20a is provided with a collar 33 which supports the filtering unit 34 which is similar to the filtering unit of Fig. 4 in that the apertures in the disks 35 are larger than the pipe 20a and the central chamber 37 is of the same cross-section as the disk apertures. The pipe 20a is provided with radial passageways 75 leading from the chamber 37 to the interior of the pipe.

The bore 24 of the rod 21 is formed with a valve seat 76 and a ball valve 77 is provided for co-operation with said seat. A spring 78 interposed between the ball 77 and an apertured plug 79 threaded into the base 24 of rod 21 biases the ball into seating position. A sleeve 80 snugly but slidably fits the rod 21 and has a flange 81 engaging the top disk 35 of the filtering unit 34. Sleeve 80 is prevented from slipping off rod 21 when the latter is unscrewed from pipe 20a and lifted with cap 18 as by staking 21a at the shoulder defined between the externally threaded portion of rod 21 and its upper parts, or in other ways. A spring 82 interposed between the cover 18 and the flange 81 serves to urge the latter against the top disk 35 and the bottom disk 35 of the filtering unit into engagement with the collar 33. The casing section 16 is provided with an inlet connector 83 through which oil to be filtered is supplied to the interior of the casing. At the bottom end of the pipe 20a there is provided an outlet connector 84 communicating with the interior of the pipe and serving to conduct filtrate away from the filter. Normally, the oil to be filtered flows through the filtering annulus 36 into the chamber 37 and thence through the passageways 75 into the pipe 20a. In the event that oil cannot pass through the filtering annular 36 at the rate it is supplied to the casing 15, it by-passes the filtering unit by way of the rod passageways 25 and rod bore 24 to the upper end of the pipe 20a, the ball valve 76 being unseated by the oil pressure.

We claim:

1. A filter comprising a stamped sheet metal bracket consisting of a flat first section having ports therethrough and a second section in the general form of half a cup, a cylindrical casing having one end seated in said second section, a pipe projecting through the bottom of said casing, a fitting receiving the end of said pipe and having passageways communicating with said ports, means in said pipe preventing intercommunication between said ports, a filtering unit in said casing, and means including said pipe for directing fluid flow from one port to the other through said filtering unit.

2. A filter comprising a stamped sheet metal bracket consisting of a flat first section having an inlet port and an outlet port extending therethrough and a second section in the general form of half a cup, a cylindrical casing having one end seated in said second section, a filtering unit in said casing having a central chamber, a pipe arranged in said chamber and having one end projecting through the bottom of said casing, a fitting receiving the said end of said pipe and having passageways communicating with said ports and the interior of said pipe, and means in said pipe preventing intercommunication between said ports, said pipe having an aperture providing communication between said chamber and the outlet port, and means providing communication between the interior of said casing and the inlet port.

3. A filter comprising a stamped sheet metal bracket consisting of a flat first section having an inlet port and an outlet port extending therethrough and a second section in the general form of half a cup, a cylindrical casing having one end seated in said second section, a filtering unit in said casing having a central chamber, a pipe extending through the bottom of said casing and into said chamber and having one end extending outwardly of said casing, said pipe having a first radial passageway providing communication between the inlet port and the interior of said casing, a fitting receiving said end of said pipe and having passageways communicating with said ports and the interior of said pipe, and means in said pipe preventing intercommunication between said first radial passageway and the outlet port, and said pipe having a second radial passageway providing communication between said outlet port and said central chamber.

4. A filter according to claim 3 characterized by a cup resting on the casing end and surrounding said pipe with its rim located above said first radial passageway, and a flexible annular diaphragm surrounding and fixed to said pipe with its outer edge engaging said rim.

5. A filter according to claim 3 characterized by a third radial passageway in said pipe providing communication between the interior of the pipe and an upper portion of said casing, a piston valve slidable in said pipe and adapted in one position to close said third radial passageway, and resilient means biasing said piston valve into said position.

6. A filter comprising a stamped sheet metal bracket consisting of a flat first section having an inlet part and an outlet part extending therethrough and a second section in the general form of half a cup, a cylindrical casing having one end seated in said second section, a filtering unit in said casing having a central chamber, a pipe extending through the bottom of said casing and into said chamber, a tube within said pipe forming an annular space therein, said pipe and said tube each having an end lying outwardly of said bottom of said casing, a fitting receiving the said outwardly extending ends of said tube and pipe and having one passageway providing communication between said annular space and said outlet port and a second passageway providing communication between said tube and the inlet port, a flange on said tube engaging the inner surface of said pipe, said pipe having a passageway in its wall providing communication between said chamber and said annular space, and a plug attached to said pipe, said plug having a passageway providing communication between said tube and the interior of said casing.

7. A filter according to claim 6 characterized by a housing surrounding said plug and having openings providing communication between the interior of said casing and said chamber, and relief valves in said housing coacting with said openings controlling flow therethrough.

8. A filter comprising a stamped sheet metal bracket consisting of a flat first section having an inlet port and an outlet port therethrough and a second section in the general form of half a cup, a cylindrical casing having one end seated in said second section, a filtering unit in said casing having a central chamber, a pipe extending through the bottom of said casing and into said chamber, a tube within said pipe forming an annular space therein, said tube and said pipe each having an end lying outwardly of the bottom of said casing a fitting receiving the outwardly-lying ends of said tube and pipe and having one passageway providing communication between said annular space and said outlet port and a second passageway providing communication between said tube and said inlet port, a flange on said tube engaging the inner end of said pipe, said pipe having a passageway in its wall providing communication between said chamber and said annular space, and a rod attached to said pipe at its inner end and having a passageway providing communication between said tube and the interior of said casing.

9. A filter according to claim 8 characterized by alined passageways in said pipe and rod providing communication between said annular space and the exterior of said rod, a sleeve valve slidably mounted on said rod for closing said last-named passageways, means biasing said sleeve into closing position, and a cylinder fixed to said rod and having a portion spaced therefrom for receiving said sleeve valve and biasing means whereby said sleeve may be moved by hydraulic pressure applied thereto to an open position relative said last-named passageways.

10. In combination, a filter comprising a cylindrical casing, a stamped sheet metal bracket consisting of a flat first portion having an inlet port and an outlet port and a second portion in the general form of half a cup receiving one end of said casing, a filtering unit in said casing and comprising two spaced-apart apertured disks and a filtering material annulus having its ends connected to said disks, a pipe arranged in said casing with one end extending outwardly of said end of said casing and having a portion extending through said filtering unit and forming therewith an annular chamber, a fitting receiving said end of said pipe and having passageways communicating with said ports and the interior of said pipe, means in said pipe preventing intercommunication between said ports, said pipe having apertures for providing communication between said chamber and said outlet port and means for providing communication between the interior of said casing and the inlet port.

11. In combination, a filter comprising a cylindrical casing, a stamped sheet metal bracket consisting of a flat first portion having an inlet port and an outlet port and a second portion in the general form of half a cup receiving one end of said casing, a filtering unit in said casing and comprising two spaced-apart apertured disks and a filtering material annulus having its ends connected to said disks, a pipe arranged in said casing with one end extending outwardly of said end of said casing and having a portion extending through said filtering unit and forming therewith an annular chamber, a fitting receiving the said end of said pipe and having passageways communicating with said ports and the interior of said pipe, said pipe having a first radial passageway for providing communication between the interior of said pipe and the interior of said casing, means in said pipe preventing intercommunication between said radial passageway and the said inlet port, and said pipe having a second radial passageway for providing communication between said outlet port and said chamber.

12. In combination, a filter comprising a cylindrical casing, a stamped sheet metal bracket consisting of a flat first portion having an inlet port and an outlet port and a second portion in the general form of half a cup receiving one end of said casing, a filtering unit in said casing and comprising two spaced-apart apertured disks and a filtering material annulus having its ends connected to said disks, a pipe arranged in said casing with one end extending outwardly of said end of said casing and having a portion extending through said filtering unit and forming therewith an annular chamber, a tube within said pipe forming an annular space, a fitting receiving said one end of said pipe and one end of said tube and having one passageway providing communication between said annular space and said outlet port and a second passageway providing communication between said end of said tube and said inlet port, a flange on said tube engaging the inner surface of said pipe, said pipe having a passageway in its wall providing communication between said chamber and said annular space and means for providing communication between the interior of said tube and the interior of said casing.

13. In combination, a filter comprising a cylindrical casing, a stamped sheet metal bracket consisting of a flat first portion having an inlet port and an outlet port and a second portion in the general form of half a cup receiving one end of said casing, a filtering unit in said casing and comprising two spaced-apart apertured disks and a filtering material annulus having its ends connected to said disks, a tubular rod closed at one end and arranged in said casing with its open end extending through the other end of said casing, a pipe attached at one of its ends to the open end of said tubular rod and having its second end extending outwardly of the first-named end of said casing and having a portion extending through said filtering unit and forming therewith an annular chamber, a tube within said pipe forming an annular space, a fitting positioned on the flat portion of said bracket and receiving the second end of said pipe and one end of said tube and having one passageway providing communication between said annular space and said outlet port and a second passageway providing communication between said one end of said tube and said inlet port, a flange on the other end of said tube closing one end of said annular space, said pipe having a passageway in its wall providing communication between said chamber and said annular space, and said tubular rod having a passageway providing communication between said tube and the interior of said casing.

14. In combination, a filter comprising a cylindrical casing, a stamped sheet metal bracket consisting of a flat first portion having an inlet port and an outlet port and a second portion in the general form of half a cup receiving one end of said casing, a filtering unit in said casing having a central chamber, a tubular rod closed at one end and arranged in said casing with its open end extending through the other end of said casing, a pipe attached at one end to the open end of said tubular rod and having its other end extending outwardly of said casing through said first named end thereof and having a portion extending through said central chamber of said filtering unit, a fitting positioned on said flat first portion of said bracket and receiving said other end of said pipe and having a passageway communicating with said outlet port and another passageway communicating with said inlet port, said pipe having a radial passageway providing communication between the first-named passageway of the fitting and the outlet port, said second-named passageway of said fitting providing communication between the inlet port and said other end of said pipe, means in said pipe preventing intercommunication between said radial passageway and the inlet port, said pipe having a second radial passageway for providing communication between said chamber and the interior of said pipe, and said pipe having a third radial passageway providing communication between the interior of said pipe and said chamber, said rod having a passageway providing communication between the interior of said casing and the interior of said pipe and a piston valve slidable in said pipe and adapted in one position to close said third radial passageway, and resilient means biasing said piston valve into said position.

15. A filter according to claim 12 characterized by a tubular rod attached to said pipe, a housing surrounding said rod and having openings providing communication between the interior of said casing and said chamber, and relief valves in said housing coacting with said openings for controlling flow therethrough.

16. A filter according to claim 13 characterized by passageways in said tubular rod providing communication between said annular space and the exterior of said rod, a sleeve valve slidably mounted on said rod for closing said last-named passageways, means biasing said sleeve into closing position, and cylinder fixed to said rod and having a portion spaced therefrom to receive said sleeve valve and biasing means whereby said sleeve valve may be moved by hydraulic pressure applied thereto.

17. In combination, a filter comprising a cylindrical casing, a tube upstanding within the casing and having an inlet conduit connected to its lower end for delivery thereto of pumped oil and an upper outlet port adjacent the upper end of said tube for admitting oil to said casing, a pipe concentrically arranged about said tube and spaced therefrom and having an outlet conduit connected thereto adjacent its lower end, said pipe having an upper port adjacent its upper end for receiving oil from said casing, a filtering unit supported within said casing and on the pipe for filtering oil in said casing in its passage from the tube and through the filtering unit, closing off means normally preventing direct passage of oil from said upper port of said tube to the said upper port of said pipe, an additional port interconnecting the pipe and the interior of the casing and a relief valve for said last-named port adjacent the top of said tube and filtering unit whereby back flow of oil from said casing upon cessation of oil pumping is prevented by the location of all of said ports at elevated points of said tube and pipe.

18. In combination, a filter comprising a cylindrical casing, a tube upstanding within the casing and having an inlet conduit connected to its lower end for delivery thereto of pumped oil and an upper outlet port adjacent the upper end of said tube for admitting oil to said casing, a pipe concentrically arranged about said tube and spaced therefrom and having an outlet conduit connected thereto adjacent its lower end, said pipe having an upper port adjacent its upper end for receiving oil from said casing, a filtering unit supported within said casing and on the pipe for filtering oil in said casing in its passage from the tube and through the filtering unit, and closing off means normally preventing direct passage of oil from said upper port of said tube to the said upper port of said pipe whereby back flow of oil from said casing upon cessation of oil pumping is prevented by the location of all of said ports at elevated points of said tube and pipe.

JULIUS P. KOVACS.
WILLIAM H. HULTGREN.

REFERENCES CITED

The following references are of record in the file of this patent:

UNITED STATES PATENTS

| Number | Name | Date |
| --- | --- | --- |
| 1,676,268 | Lipscomb | July 10, 1928 |
| 1,703,335 | Bower | Feb. 26, 1929 |
| 1,780,663 | Winslow et al. | Nov. 4, 1930 |
| 1,896,395 | Dooley | Feb. 7, 1933 |
| 2,076,934 | Burckhalter | Apr. 13, 1937 |
| 2,076,935 | Burckhalter | Apr. 13, 1937 |
| 2,158,512 | Layte et al. | May 16, 1939 |
| 2,201,418 | Williams et al. | May 21, 1940 |
| 2,203,668 | Burckhalter | June 11, 1940 |
| 2,239,868 | Williams | Apr. 29, 1941 |